Feb. 17, 1953 — C. E. WILKEN — 2,628,769
BLOWER
Filed March 17, 1947 — 2 SHEETS—SHEET 1
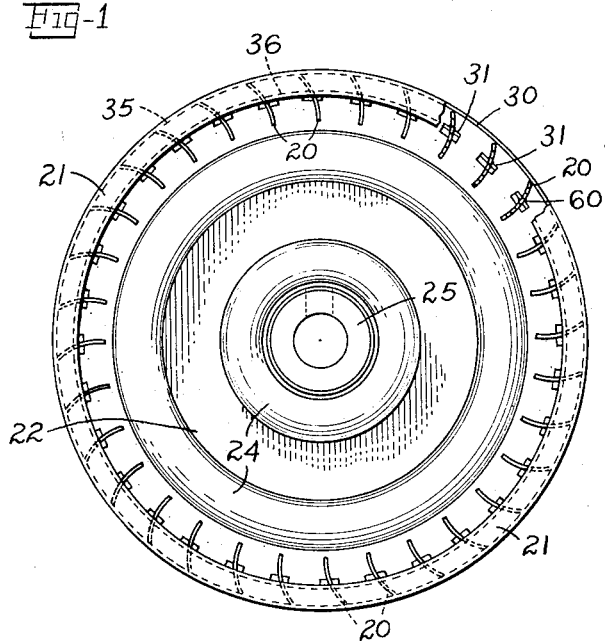
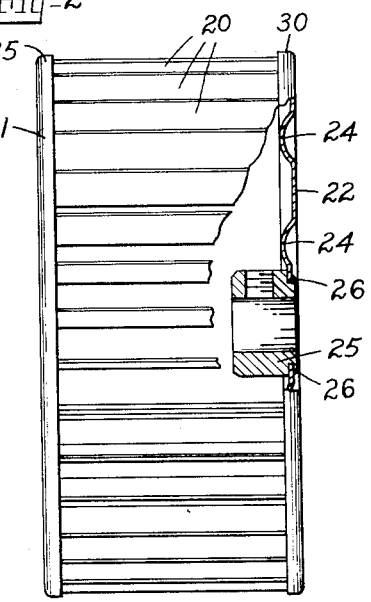
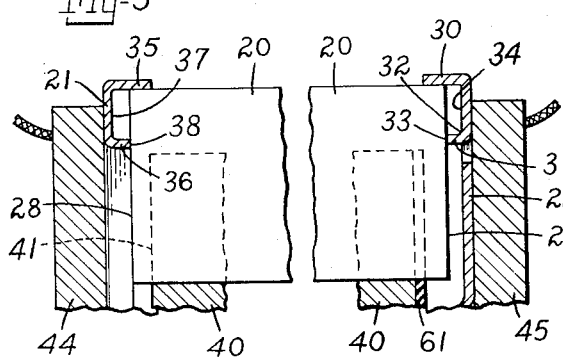
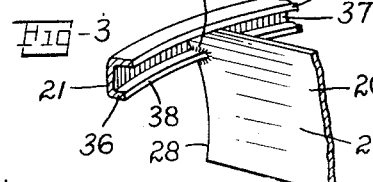
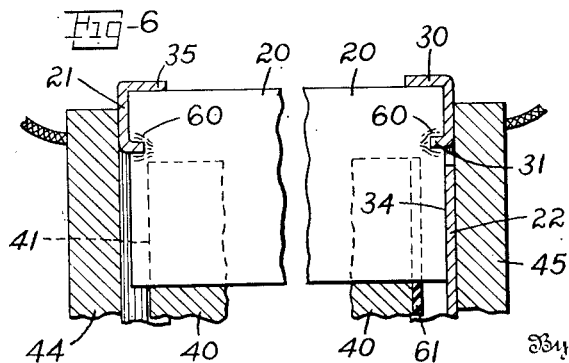
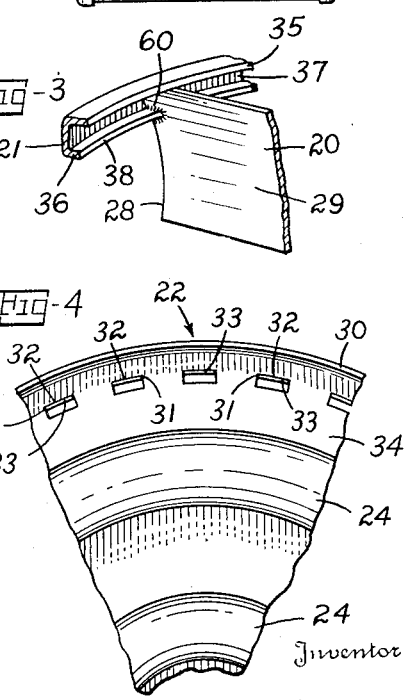
Inventor
Carl E. Wilken
By Moreschal & Biebel
Attorneys

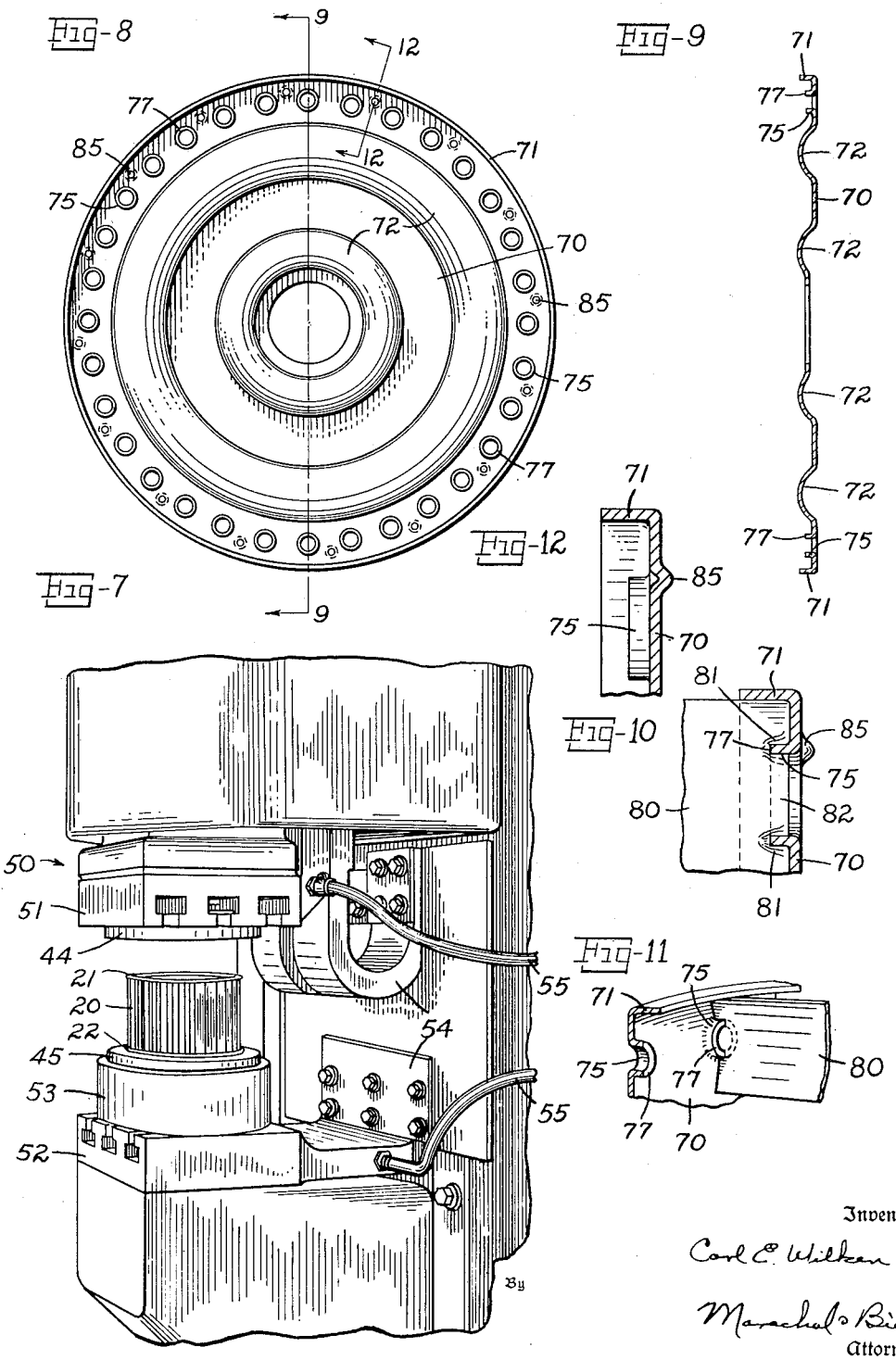

Patented Feb. 17, 1953

2,628,769

UNITED STATES PATENT OFFICE 2,628,769

BLOWER

Carl E. Wilken, New Lebanon, Ohio, assignor to The Lau Blower Company, Dayton, Ohio, a corporation of Ohio Application March 17, 1947, Serial No. 735,163

7 Claims. (Cl. 230—134)

This invention relates to multiple blade centrifugal fans of the type commonly known as blowers, and more particularly to rotors or blower wheels therefor.

One of the principal objects of the present invention is to provide a multiple blade blower wheel including end members having sheet metal parts opposed to and intersecting the ends of the blower blades and with these parts and blades welded together in limited areas and only at their intersecting portions.

Another object is to provide a multiple blade blower wheel formed of autogenously welded component parts of such configuration as to provide for maximum heat generation at their contacting portions during welding without producing objectionable heating of the remaining portions of the parts, and thus to insure adequately high strength at each welded joint.

An additional object is to provide a multiple blade blower wheel of autogenously welded construction wherein the individual component parts are of such configuration as to reduce to a minimum the mass of material at or adjacent their contacting surfaces during assembly and welding of the wheel, in order to confine the welding heat to a limited area for maximum effectiveness.

It is also an object of the invention to provide a multiple blade blower wheel composed of sheet metal end members having axially projecting fin portions on their inner surfaces which are interlocked with and welded to the axially outer ends of the blades at one or more portions along each blade end to give a wheel of great strength and rigidity.

Still another object is to provide for the production of a multiple blade blower wheel by applying axial pressure and electric current to the blades and end members under controlled conditions limiting the areas of the parts which are in electrical contact during welding, to insure concentration of the resulting heat at their contacting areas to give a strong autogenous weld at each joint.

A still further object is to provide end members for incorporation in a blower wheel which are of such construction and configuration that they may be readily welded to blower blades by the application of axial pressure and electric current and which are particularly designed to minimize heat conduction from their portions which abut the blades during the welding operation.

Other objects and advantages of the invention will be apparent from the following description, the accompanying drawing and the appended claims.

In the drawing—

Fig. 1 is a view in elevation showing the inlet end of a blower wheel constructed in accordance with the present invention, and with portions broken away to illustrate details of internal construction;

Fig. 2 is a view showing the blower wheel of Fig. 1 partly in side elevation and partly broken away and in section to illustrate internal details of construction;

Fig. 3 is an enlarged view in perspective showing a fragment of the inner side of the end ring of the blower wheel of Fig. 1 and a fragment of a blade welded thereto;

Fig. 4 is an enlarged view in elevation showing a fragment of the inner side of the end or back plate of the blower wheel of Fig. 1;

Fig. 5 is an enlarged fragmentary view illustrating the assembly of the blades and end members of the blower wheel of Fig. 1 for welding but prior to the application of the welding current thereto;

Fig. 6 is a view similar to Fig. 5 showing the parts after completion of the welding operation;

Fig. 7 is a perspective view illustrating a welding press for welding together the individual parts of a blower wheel in accordance with the present invention;

Fig. 8 is an elevational view of the inner side of a modified construction of end or back plate in accordance with the invention;

Fig. 9 is a sectional view of the end or back plate shown in Fig. 8, the view being taken on the line 9—9 of Fig. 8;

Fig. 10 is an enlarged sectional view showing a fragment of the end plate of Fig. 8 and also showing a fragment of a blade welded to the end plate;

Fig. 11 is a fragmentary view similar to Fig. 3 and showing a fragment of a blade welded to the end plate of Fig. 8; and Fig. 12 is an enlarged detail view taken in section substantially on the line 12—12 of Fig. 8.

Referring to the drawing, which illustrates a preferred embodiment of the present invention, the blower wheel comprises a multiplicity of separately formed blades 20 circumferentially arranged about a central axis and provided with end members consisting of an end ring 21 at the inlet end of the wheel and an end or back plate 22 at the axially opposite end of the wheel. The end plate 22 is shown as having a plurality of concentric ribs 24 formed therein, as by a pressing operation, to provide stiffness, and a hub 25 is indicated at 26 as staked to the end plate at its central aperture for mounting on an operating shaft. It will be understood that the hub may be secured to the end plate by other convenient means, such for example, as by welding to the inner rib 24 or by riveting, in which case a hub of larger external diameter may be used and the inner rib 24 may be dispensed with.

The blades 20 may be readily formed by stamping from a suitable sheet metal such, for example, as 24-gage steel, and they are provided with simple square ends 28 as shown in Fig. 5. Their working surfaces may, therefore, be provided with any of a wide variety of desired shapes, sizes and curvatures, the illustrated blades having a simple arcuate form to provide working surfaces 29. These blades may be arranged in any suitable uniform or non-uniform spacing about the axis of the wheel.

The end or back plate 22 may be readily formed from suitable sheet stock, satisfactory results having been obtained utilizing the same material as that in blades 20. Its outer periphery is turned over or otherwise formed, as shown, to provide a flange 30 extending inwardly of the wheel parallel to the wheel axis, and having an axial length of, for example, $\tfrac{1}{16}$ inch as measured from the outer surface of the plate 22. This flange supplements the action of ribs 24 in imparting stiffness to the end plate, and it also aids in the proper radial spacing of the blades in initial assembly of the wheel parts as well as giving a finished appearance to the completed wheel. As shown in Fig. 5, it overlaps the outer ends of the blades as the parts are assembled and thus serves to prevent their outward displacement before and during the welding operation as described hereinafter.

The end plate 22 is also formed with means projecting inwardly of the wheel to provide an edge for contact with the adjacent end of each blade in the assembly of the wheel and for welding to these blade ends by means of the simultaneous application of axial pressure and electric current. These projecting means are formed to avoid the presence of a substantial mass of material at or adjacent the portions of the parts which are in contact during welding, thus preventing such rapid heat loss by conduction through the parts that the desired strong weld may not be obtained without using an excessively large amount of current. These projecting means may be readily formed by partially separating portions of the end plate from the remainder thereof and striking or bending these portions out of the plane of the plate and substantially at right angles thereto so that they project in the direction of the length of the blades as the parts of the wheel are assembled.

Referring particularly to Figs. 4 and 5, it will be seen that these projecting means on end plate 22 comprise a plurality of tabs 31 constituting a discontinuous fin or flange. These tabs 31 are shown as of generally rectangular shape, although they may be made in other desired configurations, and they are formed on the end plate by cutting out each tab on three sides and striking or bending it along its fourth side so that it projects axially inwardly of the wheel substantially at right angles to the plane of plate 22 and substantially parallel to the wheel axis. This operation may be readily carried out, for example, by die stamping simultaneously with or subsequently to the initial formation of the end plates and the flange and ribs thereon, and as shown in Fig. 1, there may be as many of these tabs 31 as there are blades 20 and in similar angular spacing.

These tabs 31 thus each have an upturned edge 33 which is opposite and substantially parallel to its uncut side 32 and is spaced axially from the end plate by a distance substantially greater than the thickness of the tab and end plate, for example, a distance of $\tfrac{1}{16}$ inch as measured from the axially inner surface 34 of a plate 22 formed of 24-gage steel as stated. In other words, the dimensions of each tab 31 measured axially of the wheel are substantially greater than the tab thickness, measured radially of the wheel, which is essentially the same as the thickness of the end plate itself. In addition, it will be seen that the thickness of the tab is substantially the same for each part thereof, from its outer edge 33 to its side 32 along which it is connected with the body of the end plate. The length of each of these tab edges 33 should be such in relation to the size of the end plate and the number of blades in the wheel that the strength of the plate will not be materially affected by the cutting necessary to the formation of the tabs. For example, in a wheel having a diameter of 6¼ inches and containing 32 equally spaced blades, it has been found that adequate strength is maintained in an end plate of 24-gage steel with each tab edge 33 approximately ¼ inch in length.

The end ring 21 is illustrated in some detail in Figs. 3 and 5. As shown, it is provided with an inwardly turned flange 35 along its outer periphery which is similar to the flange 30 on the end plate and similarly serves both to stiffen the end ring and also to aid in the proper positioning of the blades as explained in connection with the end plate. In addition, the end ring 21 is formed with means projecting inwardly of the wheel, and corresponding to the tabs 31 on the end plate, to provide an edge for contact with the adjacent end of each blade in the assembly of the wheel and for welding thereto, and this projecting means on the end ring is formed to avoid the presence of a substantial mass of material at or adjacent the portions of the parts which are in contact during welding, for the same reasons discussed in connection with the end plate.

Referring to Figs. 3 and 5, it will be seen that this projecting means is provided on the end ring by turning over its inner periphery to form a continuous fin or annular flange 36 projecting inwardly of the wheel and substantially parallel to the outer flange 35 but of somewhat lesser axial dimensions. It will be understood that, as shown in Figs. 1 and 2, the end ring is of substantially greater inner diameter than the inner diameter of the blade portion of the wheel, for example, with an inner diameter of 5¾ inches prior to formation of flange 36 as compared with an inner diameter of 5 inches for the blade portion of the wheel. With an end ring of such dimensions formed of 24-gage steel, a satisfactory axial dimension for flange 36 is $\tfrac{1}{16}$ inch as measured with respect to the axially inner surface 37 of the end ring, and it will be seen that the thickness of this flange will be substantially equal to that of the body of the end ring except to the extent that its thickness may be decreased in the forming operation. Also, the flange 36 will have an upturned edge 38 adapted for initial contact with the ends of blades 20 in the assembly of the wheel in a manner corresponding to the tab edges 33.

Figs. 5 and 6 illustrate the assembly and welding of the component parts of the wheel constructed as described and shown. Referring to Fig. 5 the parts are initially assembled with the aid of a suitable jig, shown fragmentarily at 40, which is provided with angularly spaced grooves 41 in its periphery adapted to receive and hold the blades 20 in the proper angularly spaced relation and alignment. A jig of this type such as is described and shown in detail in application Serial No. 711,785, filed November 22, 1946 and assigned to the same assignee as this application, is highly satisfactory, and it will be noted that the jig should be of sufficiently small diameter for removal axially through the end ring after the welding operation. The end members 21 and 22 are arranged at opposite ends of the blades with the flanges thereon extending inwardly, or a second end ring may be used in place of the end plate in order to form a double inlet wheel in which case a suitable disk and hub may be subsequently mounted within the finished wheel in the usual way, such as shown for example in copending application Serial No. 635,454 filed December 17, 1945, now Patent No. 2,537,305, issued January 9, 1951 to the same assignee as this application. With the parts in these relative positions, it will be seen that the ends 24 of the blades will abut the edges 33 and 38 of tabs 31 and flange 36, respectively, and will thus be spaced from the annular inner surfaces 34 and 37 of the two end members. At the same time, with the tabs 31 and flange 36 of the above noted dimensions relative to the outer flanges 30 and 35, these outer flanges will overlap the ends of the blades as shown in Fig. 5 and will both prevent their outward displacement and also cooperate with jig 40 to provide for proper concentricity of the blades and proper balance in the finished wheel.

In order to carry out the desired welding operation, this whole assembly of parts is positioned between a pair of electrodes 44 and 45, as shown in Fig. 5, which are so mounted as to provide for exerting pressure axially of the wheel on both end members and simultaneously for applying electric current to the electrodes. For example, the electrodes 44 and 45 may be mounted as or between the dies of a press welder as shown in Fig. 7, wherein the electrode 44 is shown as carried by the slide 51 of a press welder designated generally as 50 and the other electrode 45 is mounted on the bolster plate 52, a spacing member 53 being positioned between the electrode 45 and bolster plate 52 for shortening the stroke of the slide. These parts are all formed of electric conducting metal, and electric current is supplied through the conductors 54 to the slide and bolster plate, which are also provided with cooling water through the hoses 55.

In operation, the slide 51 of the press welder 50 is actuated to apply pressure to the assembled wheel parts, and electric current is supplied through the conductors 54 in sufficient intensity to produce high current density in the small areas of contact of the blade ends 24, and the tabs 31 and flange 36 respectively, thus generating welding heat at these abutting area as the current pulsates therethrough. As a result, the blades and the projections on the end members are caused to soften and cut into each other in telescoping relation under the pressure applied, so that they interlock with accompanying reduction of the axial length of the finished wheel relative to the corresponding dimensions of its assembled component parts prior to welding, as will be readily apparent upon comparison of Figs. 5 and 6. At the same time, the interlocking portions of the blades and the projections 31 and 36 are fused together to form the desired autogenous weld as indicated at 60 in Figs. 5 and 6.

During the welding operation, and as the blades and the tabs and flange on the end members move toward each other, it will be seen that there is substantially no increase in the mass of metal at or adjacent the portions of these parts which enter into the weld, except to the extent that the fused metal surrounds the interlock of the parts. At the ring end, each blade crosses the flange 36 in such direction, substantially at right angles as will be seen in Fig. 1, that there is actual contact between only very limited areas of each blade end 24 and the flange edge 38, each of these areas being approximately equal to the product of the thickness of the blade and flange, or the square of the thickness of either part when both are formed from the same gage metal. As a result, the heat generated in the welding operation is concentrated in these portions of the parts which enter directly into the welds. A similar arrangement is provided at the end plate by forming each tab 31 so that its edge 33 is substantially normal at its center to a radius of the wheel, as is also illustrated in Fig. 1.

It will also be seen that since the blades are of substantially uniform thickness, and since the tabs 31 and flange 36 are similarly each of substantially uniform thickness throughout its axial length, there is no material increase during welding in the respective areas of these parts which are in electric contact, except as they fuse together in the desired manner, thus maintaining the necessary intense heat at these abutting areas for proper fusing of the metal to provide a strongly welded joint when the fused metal cools. Furthermore, these uniform thicknesses of the tabs and flange provide for limiting the amount of heat conducted away through the parts from their abutting portions where it is desired for proper welding. Loss of this heat may also be further controlled by forming the jig 40 of a low resistance material such as copper in order to shunt the current from the portion of each blade adjacent one end thereof to the portion adjacent the other end, as described in said application Serial No. 711,785, thus preventing waste of heat and current by heating up the blades throughout their lengths. A layer 61 of rubber or other insulating material may be provided as shown at the end of jig 40 adjacent the end plate to prevent short-circuiting therebetween.

The time, the pressure and the intensity of the current employed during welding depend to some extent upon the dimensions of the component parts of the wheel. As a specific example, in actual practice and with a wheel whose component parts are formed of 24-gage sheet steel of the above dimensions, having 32 blades each 3 inches in length, this operation has been successfully carried out utilizing electric current of about 200 kva. applied for 15 cycles and with a pressure of the order of 2500 pounds. These values will be correspondingly decreased or increased, respectively, as the size of the wheel or the thickness of its component parts are decreased or increased.

It should be noted that for preferred results in the practice of the invention, the tabs, flanges or other projecting fin means on the end members which enter into the welds should be of such dimensions that they will remain substantially rigid under the pressures applied during welding, i. e., without bending, buckling or otherwise changing shape in such manner as to increase the mass of metal adjacent each joint or the area in electrical contact with the end of a blade. Optimum results for the purposes of the invention are obtained when the blade ends and the projecting means on the end members are of uniform thickness measured axially of the wheel and cut into each other as described without otherwise materially changing shape. The dimensions given above for the tabs 31 and flange 36 on the end members being illustrative of such dimensions found satisfactory in practice.

When the above welding operation is completed, it will be found that each end of each blade and the tabs and flanges on the end members will be strongly welded together. Each blade will be telescoped and interlocked at each end with flange 36 or one of tabs 31, and the corners formed by these interlocking portions will be filled in with the metal fused during the relative axial movement of the parts, as is indicated at 60 in Fig. 6. In addition, the portions of the tabs and flange which are interlocked with each blade end will both reinforce the weld and also serve additionally to brace the blades and the welded joints against the tangential stresses incident to use. Accordingly, it will be seen that the blower wheels formed of component parts constructed and assembled as described and shown will have uniformly high strength at their joints and rigidty in operation, with minimum possibility of failure of any portion of the wheel due to an imperfectly welded joint.

Figs. 9 and 11 illustrate a modified construction of the end or back plate providing for welding to each blade at a plurality of positions along the blade end. This end or back plate 70 includes an outer flange 71 similar to the flange 30 on end plate 22, and it is also shown as provided with annular stiffening ribs 72 which correspond to the ribs 24 on end plate 22. The end plate 70 is formed to provide a discontinuous fin or flange for contact with the adjacent ends of the blades at a plurality of spaced positions on each blade end in the initial assembly of the wheel, thus providing for the desired welding to the wheel at these spaced positions.

As shown in Figs. 8 to 10, the end plate 70 is provided with a plurality of angularly spaced, tubular tab portions 75 which may be formed by punching spaced holes in the end plate and then forming the peripheries of these holes inwardly to present an annular upturned edge 77. The axial dimensions of these tubular tabs may be approximately the same as described in connection with the tabs 31 on end plate 22, and the outer diameter of each tab 75 may be approximately 0.30 inch for an end plate of the illustrative dimensions given in connection with the description of the end plate 22, it being understood that this end plate may be utilized in conjunction with an end ring 21 of the construction shown in Figs. 1 and 3.

It will be seen that with this construction, when the wheel parts are assembled as described in connection with Fig. 5, each tab edge 77 will contact the adjacent end of one of the blades 80 at two spaced positions as shown in Fig. 10. Similarly, when the welding operation is carried out by the application of pressure and electric current as described in connection with Fig. 7, each opposed blade and tab will cut into each other at these spaced positions on the blade end to produce a corresponding plurality of autogenous welds, as indicated at 81 in Fig. 10. This will result in great strength and rigidty in the finished wheel, since each of the two welds 81 reinforces the other, and since the tongue-like portion 82 of the blade which extends into tab 75 also acts as a brace as shown in Fig. 10. Furthermore, the tubular formation of the tabs 75 imparts additional rigidity to the end plate itself and hence to the finished wheel.

The construction and method of the present invention may also be applied to the production of double inlet blower wheels as described above, or two wheels constructed as described and shown may have their respective end plates welded or otherwise secured together to form a double inlet wheel similar to that shown in the above noted application Serial No. 711,785. For example, the end plates of such single wheels may be provided with angularly spaced welding dimples 85 pressed axially outwardly as shown in Figs. 8 and 11. The two single inlet wheels may then be assembled with these welding dimples on the end plates in respective contact, and electric current and pressure applied to produce autogenous welding of the end plates at these dimples, thus providing a double inlet blower wheel possessing operational characteristics of strength, rigidity and balance comparable with those of the single inlet wheels produced as described and shown.

While the methods and forms of apparatus herein described constitute preferred embodiments of the invention it is to be understood that the invention is not limited to these precise methods and forms of apparatus, and that changes may be made therein without departing from the scope of the invention which is defined in the appended claims.

What is claimed is:

1. A blower wheel of the character described comprising a plurality of separately formed blades circumferentially arranged about a central axis, a pair of end members located at opposite ends of said blades, each said end member having an annular surface thereon in face to face relation with adjacent said blade ends, each said end member also having thereon a circumferential flange extending axially inwardly of said wheel from the radially outer periphery of its said annular surface, said annular surfaces having thereon at least one integral projection extending axially inwardly therefrom and of materially smaller area than said surfaces, said projection and the ends of said blades intersecting and interlocking throughout substantially the entire axial extent of said projection to locate said blade ends in substantially abutting contact with the adjacent said annular surface, radially outer end portions of said blades being in engagement with said flanges, the interlocked portions of said projection and said blades being intimately merged together to form a substantially integral structure including substantially the entire extent of said interlocked portions, and the portions of said projection adjacent said interlocking portions extending axially inwardly of said wheel beyond the plane of the adjacent outer ends of said blades and extending integrally from both sides of said interlocking portions to brace said blades against stresses incident to the use of the wheel.

2. A blower wheel of the character described comprising a plurality of separately formed blades circumferentially arranged about a central axis, a pair of end members located at opposite ends of said blades, each said end member having an annular surface thereon in face to face relation with adjacent said blade ends, each said end member also having thereon a circumferential flange extending axially inwardly of said wheel from the radially outer periphery of its said annular surface, said annular surfaces having thereon integral projections extending axially inwardly therefrom and of materially smaller area than said surfaces, said projections intersecting the ends of said blades at spaced points along said blade ends and interlocking throughout substantially the entire axial extent of said projections to locate said blade ends in substantially abutting contact with said annular surface, radially outer end portions of said blades being in engagement with said flanges, the interlocked portions of said projections and said blades being intimately merged together in an integral weld including substantially the entire extent of said interlocked portions, and the portions of said projections adjacent said welds extending axially inwardly of said wheel beyond the plane of the adjacent outer ends of said blades and extending integrally from both sides of said welds to brace said blades against stresses incident to the use of the wheel.

3. A blower wheel of the character described comprising a plurality of separately formed blades circumferentially arranged about a central axis, an end member including an annular surface in face to face relation with the adjacent ends of said blades, said end member including a continuous annular projection extending axially inwardly from said surface and presenting a substantially uninterrupted edge of materially smaller area than said surface, said projection and said blade ends intersecting and interlocking throughout substantially the entire axial extent of said projection to locate said blade ends in substantially abutting contact with said annular surface, the interlocking portions of said projection and said blades being intimately merged together in an integral weld including substantially the entire extent of said interlocking portions, the portions of said projection between adjacent said welds extending axially inwardly of said wheel beyond the plane of the adjacent outer ends of said blades and forming continuous integral connections between said adjacent welds to brace said blades against stresses incident to the use of the wheel, and said end member having thereon a circumferential flange located radially outwardly of said projection and extending axially inwardly of said wheel in overlapping engagement with the radially outer edges of said blades.

4. A blower wheel of the character described comprising a plurality of separately formed blades circumferentially arranged about a central axis, an end ring located at one end of said wheel, said end ring being generally channel-shaped in section providing an annular surface in face to face relation with adjacent said blade ends and radially inner and outer flanges projecting axially inwardly from said annular surface, said inner flange and said blade ends intersecting and interlocking throughout substantially the entire axial extent of said flange to locate portions of said blade ends in substantially abutting contact with said annular surface, the interlocked portions of said inner flange and said blades being integrally merged in an integral weld including substantially the entire extent of said interlocked portions, the portions of said inner flange between adjacent said welds extending axially inwardly of said wheel beyond the plane of the adjacent outer ends of said blades and forming with said blades a continuous brace reinforcing said blades against tangential stresses incident to use of said wheel, and said outer flange overlapping and engaging the outer edges of said blades.

5. A blower wheel of the character described comprising a plurality of separately formed blades circumferentially arranged about a central axis, an end plate located at one end of said wheel and including an annular surface in face to face relation with the adjacent ends of said blades, a plurality of integral flanges on said end plate formed out of the plane of said annular surface to leave apertures therein and projecting axially inwardly therefrom to present edges adapted to intersect said blade ends, each said flange and one of said blade ends intersecting an interlocking throughout substantially the entire axial extent of said flange to locate said blade end in substantially abutting contact with said annular surface, the interlocked portions of said flanges and said blades being integrally merged to form a substantially integral structure including substantially the entire extent of said interlocked portions, the portions of said flanges at the sides of said interlocked portions extending axially inwardly of said wheel beyond the plane of the adjacent outer ends of said blades and extending integrally from said interlocked portions to form braces reinforcing said portions against tangential stresses incident to use of said wheel, and said end plate having thereon a circumferential flange extending axially inwardly of said wheel from the radially outer periphery of said annular surface in overlapping engagement with radially outer end portions of said blades.

6. A blower wheel of the character described comprising a plurality of separately formed blades circumferentially arranged about a central axis, an end plate located at one end of said wheel and including an annular surface in face to face relation with the adjacent ends of said blades, a plurality of generally integral flanges on said end plate formed out of the plane of said annular surface to leave apertures therein and projecting axially inwardly therefrom for intersection with said blade ends at spaced points thereon, said flanges and said blade ends intersecting and interlocking at said spaced points throughout substantially the entire axial extent of said flanges to locate said blade ends in substantially abutting contact with said annular surface, the interlocked portions of said flanges and said blades being integrally merged in integral welds including substantially the entire extent of said interlocked portions, the portions of said flanges at the sides of said interlocked portions extending axially inwardly of said wheel beyond the plane of the adjacent outer ends of said blades and extending integrally from said welds to form braces reinforcing said welds against tangential stresses incident to use of said wheel, and said end plate having thereon a circumferential flange extending axially inwardly of said wheel from the radially outer periphery of said annular surface in overlapping engagement with radially outer end portions of said blades.

7. A blower wheel of the character described comprising a plurality of separately formed blades circumferentially arranged about a central axis, an end plate located at one end of said wheel and including an annular surface in face to face relation with the adjacent ends of said blades, a plurality of tubular flanges on said end plate formed integrally out of the plane of said annular surface to leave apertures therein and projecting axially inwardly therefrom for intersection with said blade ends, there being at least one said flange for each of said blades, each said flange and one said blade end intersecting at spaced points thereon and interlocking at said spaced points throughout substantially the entire axial extent of said flange to locate portions of said blade ends in substantially abutting contact with said annular surface, each said blade end also having an integral portion thereof forming a tongue extending within the adjacent said flange, said tongue and said interlocked portions of each said flange and blade being integrally merged in an integral weld including substantially the entire extent of said interlocked portions, and said tongue portions of said blades and the portions of said flanges at the sides of said welds extending axially inwardly of said wheel beyond the plane of the adjacent outer ends of said blades and extending integrally from said welds to form braces reinforcing said welds against tangential stresses incident to use of said weld.

CARL E. WILKEN.

REFERENCES CITED

The following references are of record in the file of this patent:

UNITED STATES PATENTS

| Number | Name | Date |
|---|---|---|
| 1,085,089 | Lachman | Jan. 20, 1914 |
| 1,484,579 | Still | Feb. 19, 1924 |
| 1,995,759 | Strickland | Mar. 26, 1935 |
| 2,006,458 | Jones et al. | July 2, 1935 |
| 2,051,216 | Jones et al. | Aug. 18, 1936 |
| 2,125,697 | Swingle et al. | Aug. 2, 1938 |
| 2,181,592 | Sullivan | Nov. 28, 1939 |
| 2,208,835 | Donovan | July 23, 1940 |
| 2,242,586 | Marbach | May 20, 1941 |
| 2,272,695 | Evans | Feb. 10, 1942 |